United States Patent
Lisso et al.

(10) Patent No.: US 9,457,474 B1
(45) Date of Patent: Oct. 4, 2016

(54) OPENING PACKAGES AT HIGH SPEEDS USING ROBOTS

(71) Applicant: Amazon Technologies, Inc., Reno, NV (US)

(72) Inventors: Gregory Karl Lisso, Seattle, WA (US); Jayson Michael Jochim, Seattle, WA (US); Jon S. Battles, Medina, WA (US)

(73) Assignee: Amazon Technologies, Inc., Reno, NV (US)

( * ) Notice: Subject to any disclaimer, the term of this patent is extended or adjusted under 35 U.S.C. 154(b) by 6 days.

(21) Appl. No.: 14/323,171

(22) Filed: Jul. 3, 2014

(51) Int. Cl.
*B25J 9/16* (2006.01)
*B25J 11/00* (2006.01)

(52) U.S. Cl.
CPC ........... *B25J 9/1697* (2013.01); *B25J 11/0055* (2013.01); *Y10S 901/41* (2013.01)

(58) Field of Classification Search
CPC .... B25J 9/1697; B25J 9/0093; B25J 9/0084; B25J 11/0055; Y10S 901/41; B65B 69/00; B65B 69/0025; B65B 69/0033; B65B 69/008; B62D 1/04; B62D 1/0006; B62D 1/015; B62D 5/02; G06T 7/0004
See application file for complete search history.

(56) References Cited

U.S. PATENT DOCUMENTS

| | | | | |
|---|---|---|---|---|
| 5,040,116 A | * | 8/1991 | Evans, Jr. ............. | G01S 17/936 180/169 |
| 5,243,690 A | * | 9/1993 | Chmielewski, Jr. ... | B25J 9/1697 700/259 |
| 5,423,649 A | * | 6/1995 | Maeda ................ | B65B 69/0008 414/412 |
| 2006/0217838 A1 | * | 9/2006 | Sugino ................ | G05D 1/0251 700/245 |
| 2008/0124209 A1 | * | 5/2008 | Carrigan ................ | B65B 25/14 414/800 |
| 2011/0106310 A1 | * | 5/2011 | Kawaguchi ............. | B25J 13/00 700/253 |
| 2013/0074664 A1 | * | 3/2013 | Ewald .................... | B26D 1/015 83/13 |

OTHER PUBLICATIONS

ExactAutomation, Robotic Case Tape Cutting Demos 1 and 2, Jan. 13, 2014.*

* cited by examiner

*Primary Examiner* — Abby Lin
(74) *Attorney, Agent, or Firm* — Athorus, PLLC

(57) ABSTRACT

Conveying systems for transporting sealed containers, such as boxes, may be provided with one or more delta robots configured to cut one or more adhesive tapes or other layers provided on the sealed containers. The delta robots may include one or more blades or other cutting implements on end effectors, which may be repositioned by the delta robots in response to instructions. Such instructions may be generated based on images or imaging data captured from the sealed containers, which may be analyzed to recognize features, locations and orientations of the adhesive tapes or other layers applied across faces, seams or edges of the sealed containers. Using such robots, the sealed containers may be partially or completely opened prior to reaching one or more workers, who may quickly and efficiently access the internal contents of such containers with limited effort.

17 Claims, 8 Drawing Sheets

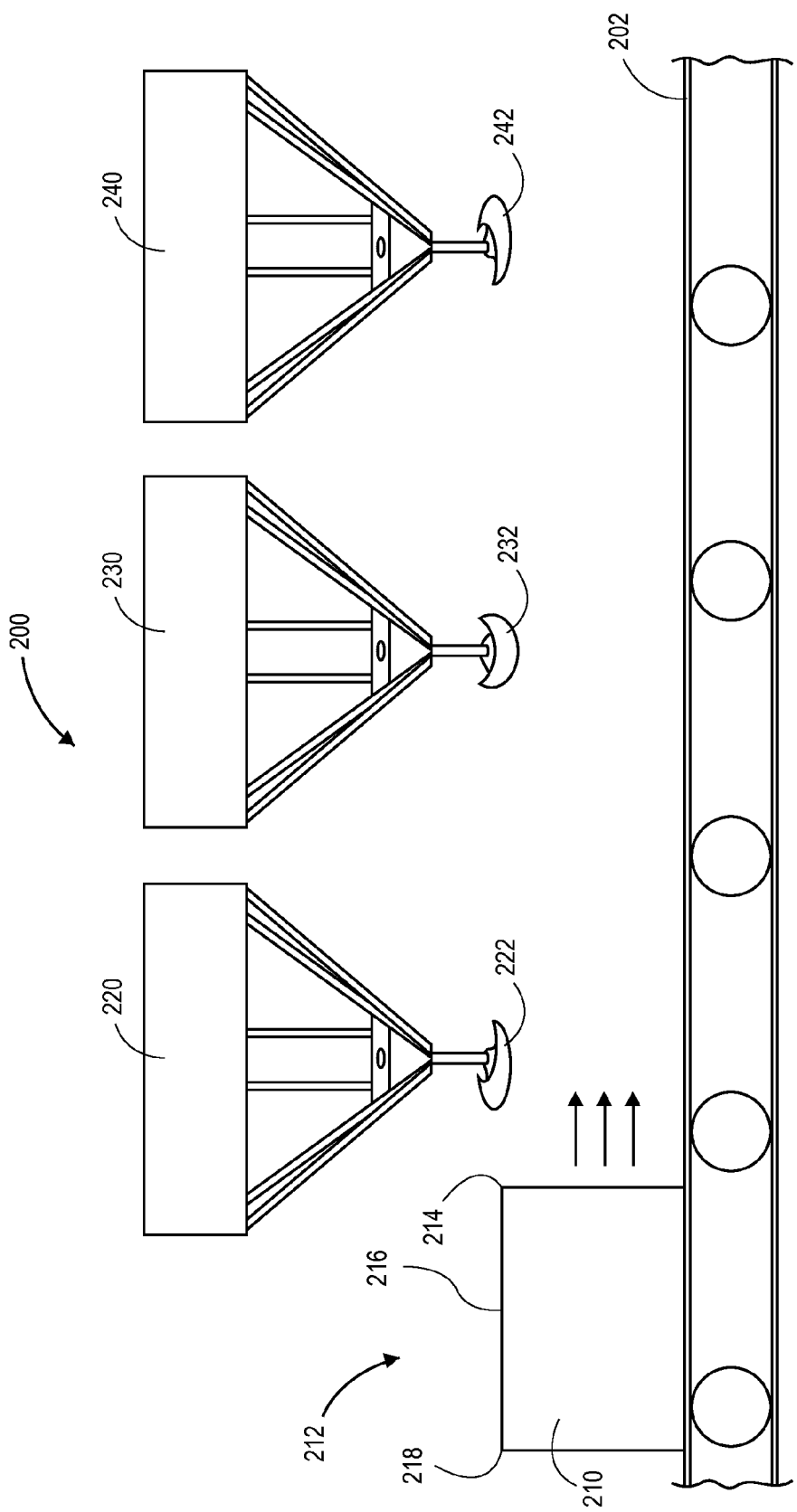

OPENING PACKAGES AT HIGH SPEEDS USING ROBOTS

BACKGROUND

Contemporary online marketplaces are able to offer a wide variety of groups or types of items (including goods, services, information and/or media of any type or form) to customers who may be located in virtually any area of the globe, in any number of ways. Such items may be delivered to a fulfillment center or other facility operated by or on behalf of the online marketplace in inbound shipments from one or more sellers, vendors, manufacturers or other sources, or from another fulfillment center.

Items that are to be made available for purchase via an online marketplace may be delivered to a fulfillment center in any number of containers of any type, including but not limited to bags, boxes, cartons, envelopes or tubes, which may be closed with any form of sealant, layer or adhesive agent. When an inbound shipment of items arrives at a fulfillment center, e.g., by car, van, truck, train, ship or aircraft, the containers included in the shipment are received at a receiving station and recognized or registered using one or more computer systems, such as by scanning or reading one or more bar codes or other marked identifiers on external surfaces of the containers. The containers may then be either transported to a designated storage area or facility, so that the items contained therein may be placed into storage, or "cross-docked" to a distribution station, so that the items contained therein may be readied for prompt delivery to customers.

Within a fulfillment center environment, containers of items are typically transported from a receiving station to a storage area or a distribution station by way of a conveying system that includes one or more conveyors (e.g., belts or rollers). In most situations, when a container reaches its ultimate destination, a human operator must manually open the container, remove the items from the container and deposit the items in a designated location at the ultimate destination, e.g., into a designated storage vessel, or onto a preparation table where the items may be prepared for delivery.

A modern fulfillment center may be designed to receive inbound shipments that include tens of thousands of individual containers on a daily basis, and at high rates of speed. Typically, the most arduous and time-consuming task associated with receiving items at a fulfillment center involves the opening of such containers. For example, where items arrive at a fulfillment center in a cardboard box, the shipping or packing tape joining two or more flaps of the cardboard box must be torn or slit by a human operator using his or her bare hands or a handheld tool, e.g., a utility knife or other cutting apparatus, before the items may be removed therefrom. In view of the number of inbound shipments that arrive at a fulfillment center each day, the seemingly simple manual act of opening a container represents an impediment to productivity that may not presently be overcome by existing systems or methods for receiving inbound shipments.

BRIEF DESCRIPTION OF THE DRAWINGS

FIGS. 2A and 2B are views of components of one system for opening packages at high speeds using robots in accordance with embodiments of the present disclosure.

DETAILED DESCRIPTION

Figure 1A:
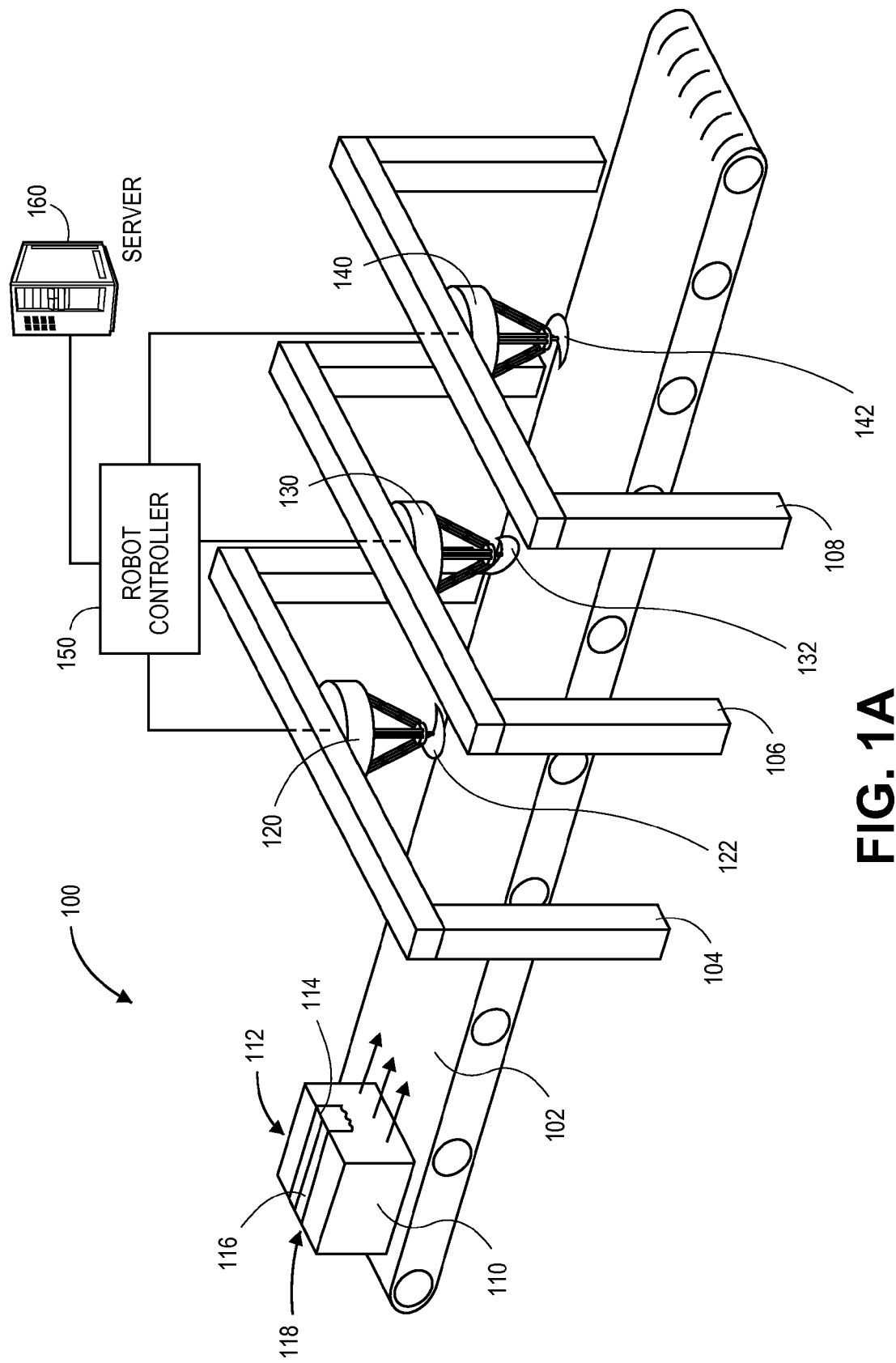
FIGS. 1A-1E are views of components of one system for opening packages at high speeds using robots in accordance with embodiments of the present disclosure.

As is set forth in greater detail below, the present disclosure is directed to the use of robots to open sealed packages that may be traveling at high speeds. More specifically, the systems and methods disclosed herein are directed to providing delta robots having one or more cutting implements on end effectors thereof in series along a conveying system, such that sealed containers, e.g., boxes, canisters, crates, envelopes, tubes or other vessels that are sealed using various tapes, glues, or other closing agents (e.g., pressure-sensitive adhesives), may be opened when the cutting implement comes into contact with one or more of the surfaces of the sealed container or one or more of the agents.

Referring to FIGS. 1A-1E, views of components of one system 100 for opening packages at high speeds using robots in accordance with embodiments of the present disclosure is shown. The system 100 includes a conveyor 102 and three frames 104, 106, 108 which provide support for three delta robots 120, 130, 140 suspended above the conveyor 102. An item 110 (e.g., a box or other container) is provided on the conveyor 102. The item 110 includes a closing agent 112 (e.g., an elongated piece or strip of packing tape joining two or more flaps of the box) spanning across a front seam 114, a top seam 116 and a rear seam 118 of the item 110.

Each of the delta robots 120, 130, 140 includes a cutting implement (e.g., a blade) 122, 132, 142 provided in a different alignment or orientation. For example, the cutting implement 122 points in a rearward direction with respect to a direction of travel of the conveyor 102, and is aligned in a plane that is substantially parallel to a plane of the conveyor 102. Likewise, the cutting implement 132 points in a downward direction with respect to the direction of travel of the conveyor 102, and is aligned in a plane that is substantially perpendicular to the plane of the conveyor 102. The cutting implement 142 points in a forward direction with respect to the direction of travel of the conveyor 102, and is aligned in a plane that is substantially parallel to the plane of the conveyor 102. Additionally, each of the delta robots 120, 130, 140 may be operated using a robot controller 150 in communication with a server 160 or another computing device, which may cause the cutting implements 122, 132, 142 to be raised or lowered in a vertical direction to one or more elevations, translated in a horizontal direction to one or more lateral positions, or moved in a combination of a vertical direction and one or more horizontal directions.

Figure 1B:
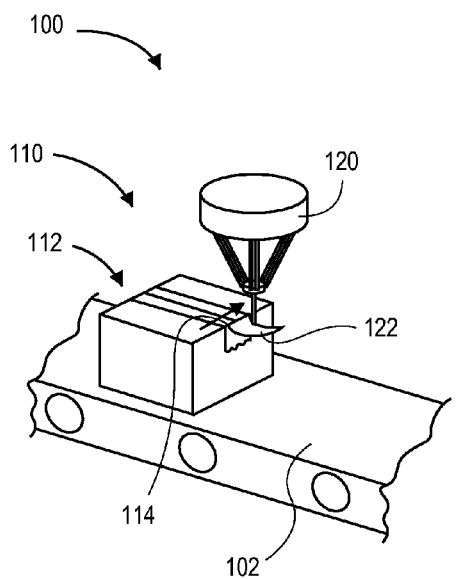

In accordance with the present disclosure, the plurality of delta robots 120, 130, 140 may be provided aligned with the conveyor 102, and programmed to cut (e.g., pierce, slice, slit or split) one or more of the front seam 114, the top seam 116 and the rear seam 118 as the item 110 passes along on the conveyor 102. The plurality of delta robots 120, 130, 140 may recognize the locations of the seams 114, 116, 118, and cause the cutting implements 122, 132, 142 to contact the seams 114, 116, 118 in series, thereby resulting in an opening of the item 110 without any human intervention, and without having to remove the item 110 from the conveyor 102. Referring to FIG. 1B, the delta robot 120 is shown as placing the cutting implement 122 in contact with the closing agent 112 at the front seam 114, and moving the cutting implement 122 in a transverse direction with respect to a direction of travel of the item 110. The cutting implement 122 thereby causes the closing agent 112 to be sheared at the front seam 114.

Figure 1C:
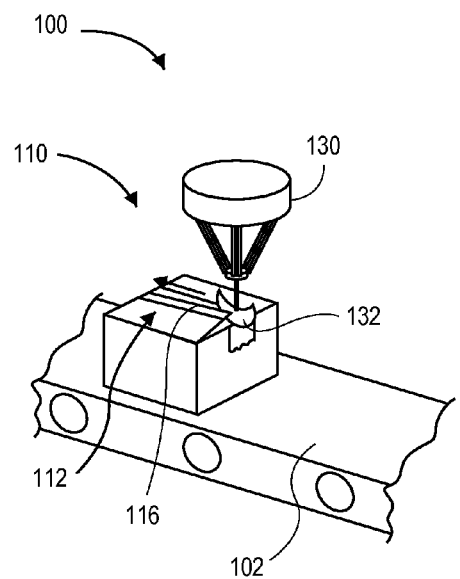
Figure 1D:
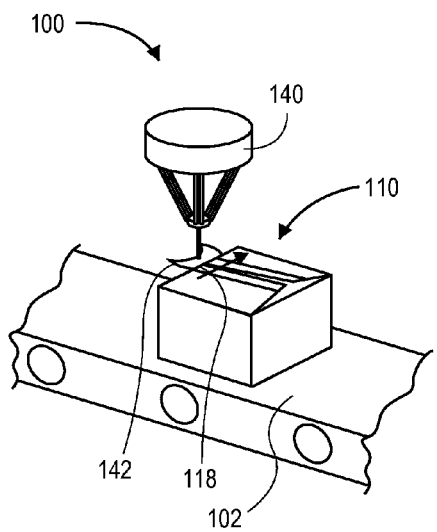

Referring to FIG. 1C, the delta robot 130 is shown as placing the cutting implement 132 in contact with the closing agent 112 at the top seam 116, and moving the cutting implement 132 in an axial direction with respect to the direction of travel of the item 110. The cutting implement 132 thereby causes the closing agent 112 to be sheared along the top seam 116. Referring to FIG. 1D, the delta robot 140 is shown as placing the cutting implement 142 in contact with the closing agent 112 at the rear seam 118, and moving the cutting implement 132 in a transverse direction with respect to the direction of travel of the item 110. The cutting implement 142 thereby causes the closing agent 112 to be sheared at the rear seam 118.

Figure 1E:
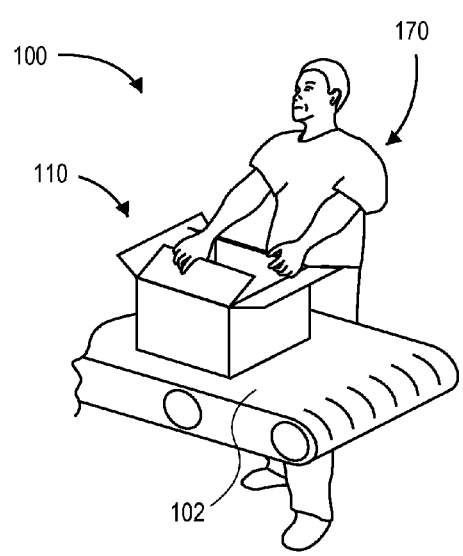

Referring to FIG. 1E, with the closing agent 112 sheared at the front seam 114, the top seam 116 and the rear seam 118, a worker 170 is shown as examining the internal contents of the item 110. The worker 170 is thus able to manually access the internal contents the item 110 quickly and easily, and without having to rip, tear or shred the closing agent 112 with his or her bare hands, or to shear the closing agent 112 using a handheld tool (e.g., a utility knife).

Accordingly, by providing one or more robots, e.g., delta robots or other robots capable of translation or rotation in or about multiple axes, in series along components of a conveying system, the systems and methods disclosed herein may increase the efficiency of operations in a fulfillment center or like facility, by automatically opening one or more seams or edges of sealed containers arriving by way of the conveying system using blades or other cutting implements provided on the end effectors of one or more robots. Where the cutting implements cause one or more of the seams or edges to be opened, the task of accessing the internal contents of the sealed container is greatly simplified. Moreover, the robots may be configured to recognize the locations of the seams or edges and to apply cutting implements to such seams or edges at high speeds, thereby enabling the containers to be opened without stopping or otherwise hindering the receipt of inbound shipments of items.

Presently, when an inbound shipment or parcel consisting of one or more containers arrives at a fulfillment center or other storage or handling facility in a carrier (e.g., a trailer, a freight car, a container ship or a cargo plane), one or more workers at the fulfillment center must remove the containers from the carrier, manually identify and/or read a shipping label or tracking number on the containers in order to identify the shipment or parcel, and search for a purchase order that may be affixed to one or more of the containers. Based on the information included on the label (e.g., a tracking number) and/or in the purchase order, a source of the shipment or parcel may then be identified. Once the source of the shipment or parcel is identified, one or more of the workers may open the containers, remove any dunnage, and identify and examine the items contained therein, in order to determine whether any of the items require any further preparation upon their arrival at the facility. Subsequently, the items may be deposited in a designated storage vessel, or cross-docked to a distribution station and prepared for delivery.

A "delta robot," or a "delta-type robot," is a parallel robot that includes three or more arm linkages formed from pairs of arms. The arm linkages extend between a base and an end effector, with the pairs of arms of the arm linkages being pivotally mounted to the base and the end effector, and forming parallelograms. The arm linkages enable the end effector to be suspended above a working surface, and may be configured to be independently raised and lowered in concert with one another by any means, such as by using a motorized or motor-driven carriage riding along one or more tracks defined by the pairs of arms that may be operated by a robot controller or control system. Additionally, the arm linkages may be operated in a manner that causes the end effector to either rise or fall, or translate in any horizontal direction. The parallelogram relationship formed by the pairs of arms enable the end effector to remain in a particular orientation as the end effector rises or falls, or translates in a given horizontal direction. Each of the pairs of arms in the arm linkages may be constructed from several concentrically joined sections, each of which can be rotated and translated in a three-dimensional space so as to achieve a desired position of the end effector of the robotic arm, and thus achieve a desired position and orientation of the end effector in three-dimensional space.

Delta robots are used in many industrial or commercial applications in which speed and flexibility are required in connection with the performance of automated tasks. For example, delta robots are frequently provided in suspension over conveyors and configured to grasp or move objects passing along the conveyors, and to place such items in a designated receptacle. Such operations take advantage of the lightweight nature of the arm linkages and the flexibility with which such linkages may reposition an end effector within an environment. In this regard, a delta robot may be programmed to quickly and efficiently complete a task using one or more tools or other devices provided on an end effector, even in a fast-paced environment in which objects are traveling rapidly or in multiple directions. Such tools or devices may include any number of actuation mechanisms that may be independently controlled by the same controller or control system that operates the arm linkages, carriages, motors or other aspects of the delta robot itself, or a different controller or control system. Moreover, delta robots are frequently provided with specifically programmed software applications or hardware components that enable the arm linkages, carriages, motors or other aspects to operate in response to one or more control signals.

Conveyor systems may be used to transport objects, items or materials of varying sizes and shapes, and typically include any number of machines or elements for causing the motion or translation of such objects, items or materials from one location to another. Any form of mover, e.g., belts, chains, screws, tracks or rollers, may drive the machines or elements that cause or enable such motion or translation and the objects, items or materials may be transported in a container or carrier, or on or within the mover itself. A conveyor system may further include one or more pulleys, shafts, hubs, bushings, sprockets, bearings and other elements for causing a movement of the conveyor. Further, a conveyor system may convey objects, items or materials into one or more static or dynamic apparatuses, such as a bin, a chute, a cart, a truck or another like machine.

One component commonly found in conveyor systems is a conveyor belt, which may include a banded continuous-loop belt (e.g., rubber or fabric) that is placed into motion by a series of two or more pulleys, at least one of which is driven by a motor. Objects, items or materials may be placed directly onto the belt, or into one or more bins or like containers that may be placed on the belt. Similarly, a chain conveyor may carry one or more pendants, which may be used to pull unit loads on pallets or in other large-scale containers. Conveyor systems may also include a gravity conveyor, which may consist of a series of rollers that may be used to move objects based on a difference in height, and a resulting difference in gravitational potential energy, without the use of a motor, or any other type of conveyor known to those of ordinary skill in the pertinent arts.

Items may arrive at a fulfillment center or like facility in inbound shipments of any number, type or form of containers, including but not limited to boxes, canisters, crates, envelopes or tubes, which may be created from any suitable material (e.g., corrugated cardboard, wood, paper, metal, plastic) and formed into standard or custom sizes. The containers may be closed with any number of types or forms of closing agents, including one or more adhesive tapes or other layers, bands, belts, straps, loops or other apparatuses, shrink-wrap plastic layers, as well as one or more glues, cements or other sealing substances. For example, containers may be closed with shipping tape or packing tape (e.g., strongly adhesive plastic tape that may be reinforced with one or more fiberglass or woven threads), as well as duct tape (e.g., a composite of woven fabric and polyethylene that is backed with a high-tack adhesive and may form waterproof or nearly waterproof seals), electrical tape (e.g., an elastic polyvinylchloride strip backed with a rubber-like adhesive), masking tape or painter's tape (e.g., a thin and easily torn strip of paper having a releasable pressure-sensitive adhesive backed thereon), or any other like forms of tape or other flexible adhesives. In addition to tapes, such containers may be sealed with any type or form of glues or cements, e.g., liquid adhesives comprising acetates, aliphatic compounds, epoxies or polyurethanes, or any other type or form of sealants.

Furthermore, items may be packaged in such containers along with any type or amount of dunnage, which may be provided in order to protect the item from collisions or other potentially harmful contact with the interior surfaces of the container during shipment. Some examples of such dunnage may include paper, wood, fabric, plastic or foam. Additionally, the containers may be delivered to a fulfillment center by any single mode of transit (e.g., by land, sea and/or air transit), or by two or more modes of transit (e.g., via air to an airport or via sea to a seaport, and via ground from the airport or seaport to a customer).

Many imaging devices, such as digital cameras, operate by capturing light that is reflected from objects, and subsequently calculating or assigning one or more quantitative values to aspects of the reflected light, e.g., pixels, generating an output based on such values, and storing such values in one or more data stores. Such imaging devices may include one or more sensors having one or more filters associated therewith, and such sensors may detect information regarding aspects of any number of pixels of the reflected light corresponding to one or more base colors (e.g., red, green or blue) of the reflected light. Such sensors may generate data files including such information, and store such data files in one or more onboard or accessible data stores (e.g., a digital video recorder, or "DVR"), as well as one or more removable data stores (e.g., flash memory devices), or displayed on one or more broadcast or closed-circuit television networks, or over a computer network as the Internet. Data files that are stored in one or more data stores may be printed onto paper, presented on one or more computer displays, or subjected to one or more analyses, such as to identify items expressed therein.

Furthermore, some modern imaging devices may digitally or electronically adjust an image identified in a field of view, subject to one or more physical and operational constraints. For example, a digital camera may virtually stretch or condense the pixels of an image in order to focus or broaden the field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in a digital image, including colors, textures or outlines of the features or objects, may be extracted from the image in any number of ways. For example, colors of pixels, or of groups of pixels, in a digital image may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Moreover, textures or features of objects expressed in a digital image may be identified using one or more computer-based methods, such as by identifying changes in intensities within regions or sectors of the image, or by defining areas of an image corresponding to specific surfaces. Furthermore, outlines of objects or features expressed in a digital image may be identified using one or more algorithms or machine-learning tools. Some such algorithms or tools may recognize edges, contours or outlines of objects or features in a digital image, or of portions of objects or features in the digital image, and may match the edges, contours or outlines of the objects or features against information regarding edges, contours or outlines of known objects or features, which may be stored in one or more data stores.

The systems and methods of the present disclosure are directed to providing a plurality of robots (including, but not limited to, one or more delta robots) in series along a conveying system, with each of the robots including a blade or other cutting implement on an end effector, and identifying a sealed container having one or more seams or folds sealed using a closing agent (e.g., an adhesive layer such as a shipping tape or packing tape). Upon identifying a location of the at least one seam or fold, instructions may be provided to the robots, thereby causing each of the robots to reposition the respective end effectors to cut into the seams or folds (e.g., to raise or lower the end effector to an elevation of a seam or a fold, or to translate the end effector in left, right, forward or backward directions to a lateral position for contacting the seam or the fold) as the sealed container travels along a conveyor in order to cause the blade or the other cutting implement to contact the closing agent at a predetermined time (e.g., when the sealed container arrives at one of the robots).

The systems and methods disclosed herein may thus facilitate the task of opening a sealed container, and enable workers or other staff members to access the internal contents of the sealed container quickly and easily, by identifying information regarding a speed, an alignment or an orientation of a container traveling along a conveyor, as well as a location of one or more adhesive tapes or other layers or other closing agents applied to faces, seams or folds of the container, generating instructions for operating one or more robots bearing blades or cutting implements thereon (e.g., raising, lowering or translating end effectors on which such blades or cutting implements are provided), and furnishing such instructions to the robots in order to guide the blades or cutting implements into contact with one or more of the faces, seams or folds.

Preferably, the systems and methods disclosed herein provide or operate three delta robots having blades aligned in three directions in series for cutting closing agents such as adhesive tapes or other layers in three locations on or near an upper surface of an object traveling along a conveyor, such as is shown in FIGS. 1A-1E. Alternatively, the systems and methods disclosed herein may preferably provide or operate two or more delta robots that may effectively act in parallel with one another, and execute cutting operations at portions of a single object at the same time. Those of ordinary skill in the pertinent arts will recognize that any number of robots that are capable of motion in multiple directions or about multiple axes may be provided, as may be necessary or desired, for the purpose of cutting seams or folds on one or more faces, seams or edges of a sealed container of any shape. For example, a sealed container in a shape of a rectangular solid may include closing agents such as adhesive tapes or other layers provided on any one of six faces or twelve seams or edges thereof. Therefore, in accordance with some embodiments of the present disclosure, a single robot may be provided for cutting one of the seams, and a worker or other staff member may utilize the split seam to obtain leverage for ripping or tearing adhesives that may be located on any of the remaining seams as necessary in order to access the internal contents of the sealed container. Even where only a single seam is cut in accordance with the present disclosure, the single cut seam may enable a worker to access contents of the sealed container and reduce any associated delays in processing the contents. In accordance with some other embodiments of the present disclosure, however, multiple robots may be provided for the purpose of cutting closing agents (e.g., adhesive tapes or other layers) that may be located on any of the faces of an object, or on any of the edges or seams of the object, as may be necessary.

Moreover, the robots of the present disclosure may be provided in one or more groups and operated collectively as a group. For example, where a plurality of seams or folds on which an adhesive tape or other layer is provided on an object are identified, control signals may be provided to multiple robots in order to cause such robots to operate in concert to cut the adhesive tape or other layer at one or more of the seams or folds. Additionally, multiple groups of robots may be provided in concert with one another. For example, a first group of delta robots may be provided for use on objects having adhesive tapes or other layers aligned in parallel to a direction of travel of the objects, while a second group of delta robots may be provided for use on objects having adhesive tapes or other layers aligned perpendicular to the direction of travel of the objects. Thus, when an object is recognized as having an adhesive tape or other layer aligned in parallel to a direction of travel of the object, the first group of delta robots may be operated to cut the adhesive tape or other layer on one or more seams or folds, or when the object is recognized as having an adhesive tape or other layer aligned in parallel to the direction of travel of the object, the second group of delta robots may be operated to cut the adhesive tape or other layer on one or more seams or folds. Those of ordinary skill in the pertinent arts will further recognize that the systems and methods disclosed herein are not limited to any particular number of robots, or any particular number of groups of robots.

The systems and methods of the present disclosure are not limited to cutting closing agents such as adhesive tapes or layers, glues or other sealants. Rather, the systems and methods of the present disclosure may be configured to execute any type or form of cutting operation upon an item at a desired location using blades or other cutting implements provided on one or more robots. For example, one or more delta robots may be configured to slice portions of a cardboard box or other container in a manner that removes all or a portion of one or more faces of the box or container, or otherwise provides an alternate entry point into the box or container that may permit one or more workers to access internal contents of the previously sealed box or container.

The systems and methods of the present disclosure are also not limited to any particular type or form of cutting implement. For example, the robots disclosed herein may include one or more fixed blades provided on end effectors thereof, such as is shown in FIGS. 1A-1E, and pointed or aligned in one or more directions. Alternatively, the robots disclosed herein may include one or more moving blades, including blades that may be caused to rotate or translate independent of any rotation or translation of the end effectors on which they are provided. Further, the cutting implements need not require traditional blades. Rather, the end effectors of the robots disclosed herein may be provided with or more rotating grinders or cutters, as well as short-range tunable lasers or other cutting systems, in accordance with the present disclosure. The blades or cutting implements also need not be provided in a line or limited to operation in a particular dimension. For example, a cutting implement may comprise a pin-shaped blade that is configured to cut a closing agent or other material in any linear direction within one or more planes, or in any rotational direction about one or more axes.

Additionally, the operation of the robots of the present disclosure may be guided or controlled on any basis. For example, one or more imaging devices may be provided in accordance with the present disclosure for the purpose of capturing imaging data regarding a sealed container, and the imaging data may be evaluated to identify or otherwise recognize the locations of any seams or folds on the sealed container, and the robots may be configured to reposition one or more cutting implements accordingly. The robots may be instructed to raise or lower a blade or other cutting implement to a given vertical elevation, or to translate the blade or other cutting implement in one or more directions within a horizontal plane to a lateral position. Additionally, the robots may be further instructed to cause the blade or other cutting implement to execute a cutting operation to a predetermined depth within a surface of a container. For example, the robots may be configured to cut into a cutting agent or other portion of a surface of the container to a predefined, nominal depth, e.g., one-eighth of an inch (or ⅛"). Alternatively, the robots may be configured to execute a cutting operation to a customized depth that may be selected based on one or more properties of the container or one or more internal contents thereof, or based on the purposes for which the robots are provided, such as to fully or partially enable access to the container.

Figure 2A:
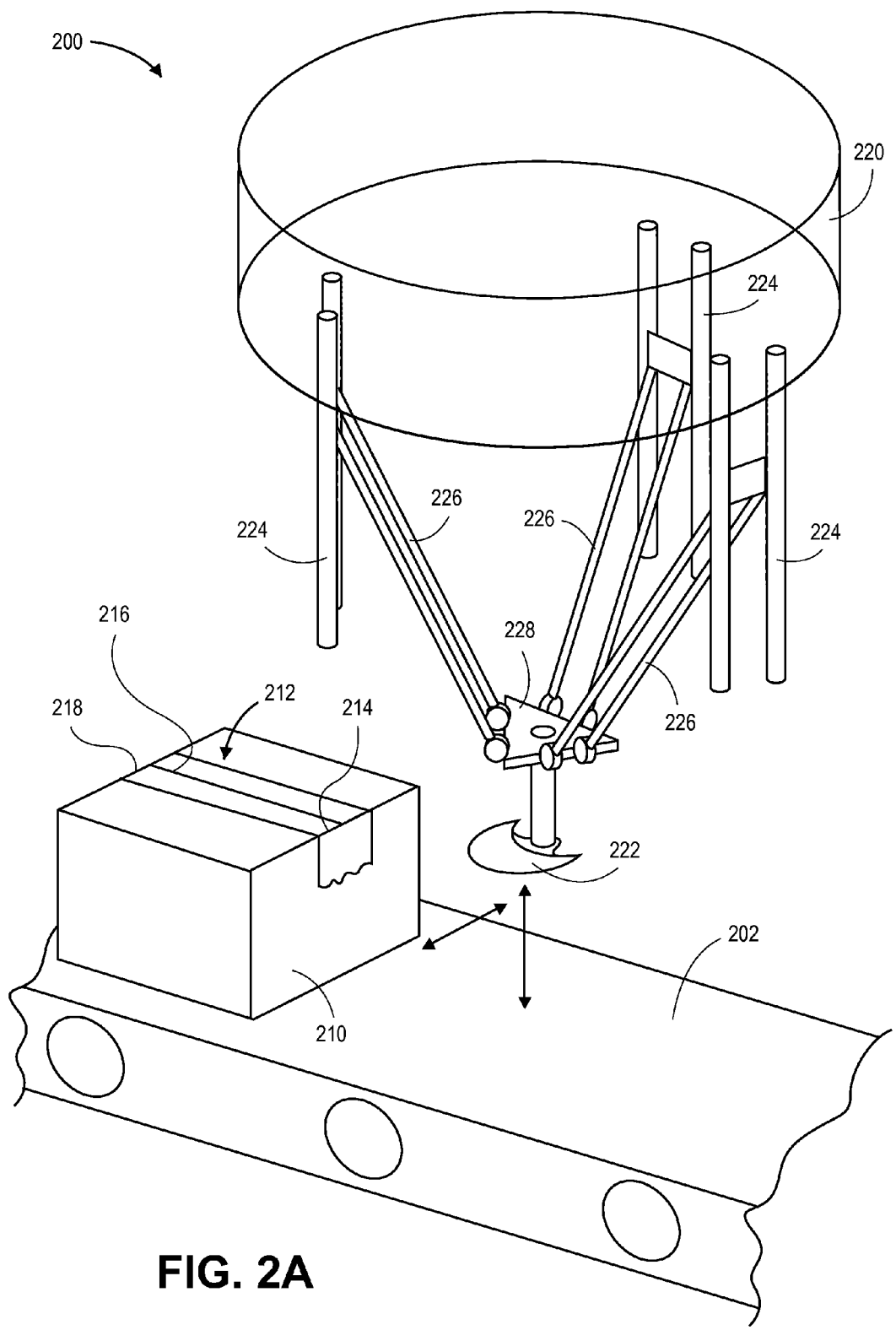

Referring to FIGS. 2A and 2B, views of components of one system 200 for opening packages at high speeds using robots in accordance with embodiments of the present disclosure are shown. As is shown in FIG. 2A, the system 200 includes a conveyor 202 having a sealed container 210 traveling thereon, and a delta robot 220 suspended over the conveyor 202. The delta robot 220 includes a blade 222, three carriages 224, three arm linkages 226 and an end effector 228. Each of the carriages 224 supports an arm linkage 226 defined by a pair of arms, and the end effector 228 is mounted to ends of each of the arm linkages 226. Additionally, the blade 222 is mounted to the end effector 228. The sealed container 210 is sealed by a closing agent 212, which forms a front seam 214, a top seam 216 and a rear seam 218 on the item.

In accordance with the present disclosure, a robot, such as the delta robot 220 of FIG. 2A, may be configured to cut, pierce, slice, slit or split the closing agent 212 on the sealed container 210 using the blade 222. As is shown in FIG. 2A, the blade 222 may be oriented such that the blade 222 points in an opposite direction of the direction of travel of the conveyor 202, and is aligned in a plane of the conveyor 202, or of an upper surface of the sealed container 210, such that the blade 222 will come into contact with the closing agent 212 at the front seam 214. The delta robot 220 may be configured to raise or lower the blade 222, or to translate the blade 222 in any direction, by raising or lowering one or more of the arm linkages 226, as necessary, to a lateral position required in order to contact the closing agent 212 at the front seam 214. Alternatively, the end effector 228 may include one or more rotational apparatuses (not shown) that may cause the blade 222 to rotate about an axis defined by the end effector 228, and to strike the sealed container 210 in any desired location.

As is discussed above, one or more robots may be provided in series along a conveying system, in order to cut one or more closing agents (e.g., adhesive labels or tapes) or portions of such agents in different locations or seams. Referring to FIG. 2B, the system 200 includes three delta robots 220, 230, 240, with each of the delta robots 220, 230, 240 including a blade 222, 232, 242. Thus, as the sealed container 210 passes along on the conveyor 202, the delta robot 220 may be controlled in order to cause the blade 222 to cut the closing agent 212 at the front seam 214 on the sealed container 210. Subsequently, the delta robot 230 may be controlled in order to cause the blade 232 to cut the closing agent 212 at the top seam 216 on the sealed container 210, and the delta robot 240 may be controlled in order to cause the blade 242 to cut the closing agent 212 at the rear seam 218 on the sealed container 210.

Additionally, robots that are equipped with one or more blades or cutting implements on end effectors thereof may be provided in series along other components of a conveying system (not shown in FIG. 2B) in accordance with the present disclosure. For example, a pushing or skewing bed, station or apparatus may be provided upstream of one or more robots, in order to justify items traveling along a conveyor, e.g., force the items into a desired alignment or configuration, prior to reaching the robots. Alternatively, the systems and methods of the present disclosure may provide one or more machines or apparatuses for rotating or otherwise repositioning an item into a given alignment, as necessary.

Thus, the operation of the systems and methods of the present disclosure may be standardized and simplified by ensuring that items are provided to robots in a common orientation. Likewise, the conveyors of a conveying system may be configured to provide a predetermined gap, distance or spacing between items traveling along such conveyors prior to their arrival at the robots, thereby affording the systems and methods disclosed herein sufficient time and space to reposition the robots in order to properly contact seams or edges of items as they arrive in succession. Those of ordinary skill in the pertinent arts would recognize that the robots disclosed herein may be provided in any application in which the cutting of a seam, a fold or another aspect of a closing agent or other adhesive applied to an object in motion may be desired.

The effects of cutting a closing agent on a sealed container using robots provided in series, e.g., cutting the closing agent 212 on the sealed container 210 using the delta robots 220, 230, 240 of FIG. 2B, may be shown with regard to FIGS. 3A-3D. Referring to FIGS. 3A-3D, components of one system 300 for opening packages at high speeds using robots in accordance with embodiments of the present disclosure are shown. The system 300 includes a sealed container 310 having a closing agent 312, e.g., at least one layer of an adhesive tape, provided across a front seam 314, a top seam 316 and a rear seam 318.

Figure 3B:
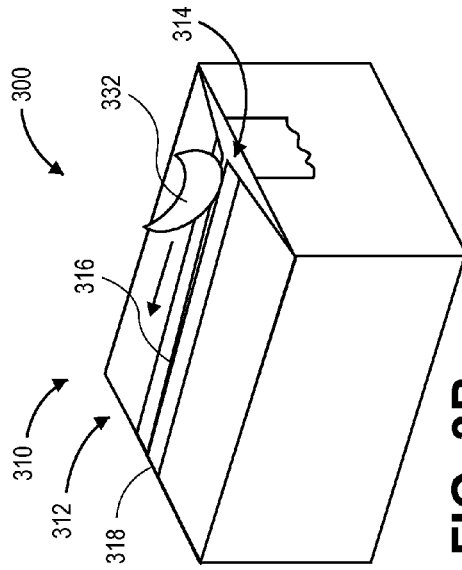
FIGS. 3A-3D are views of components of one system for opening packages at high speeds using robots in accordance with embodiments of the present disclosure.
Figure 3D:
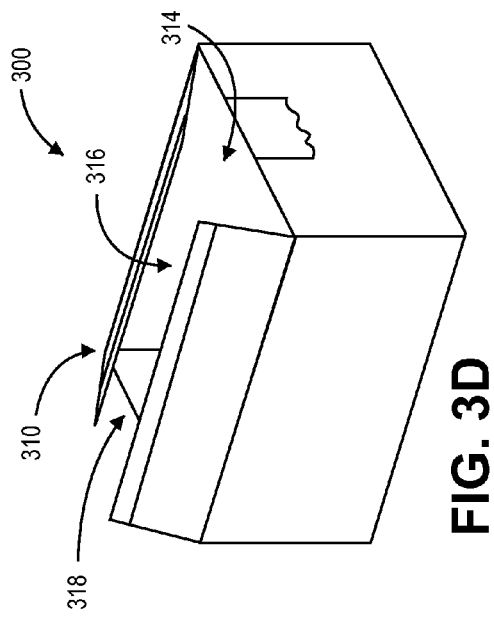
Figure 3A:
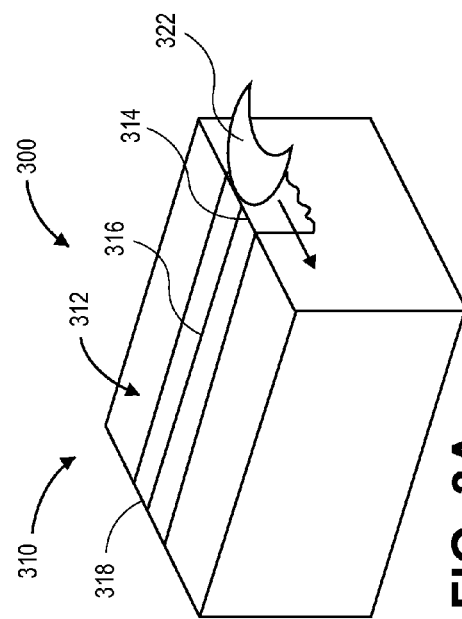

As is shown in FIG. 3A, a blade 322 may be provided on a robot (not shown) and caused to contact the front seam 314 of the closing agent 312, e.g., by passing horizontally across the front seam 314, while the sealed container 310 is in motion. The cutting of the closing agent 312 at the front seam 314 may relieve tension in the closing agent 312, and thereby create a resonance effect which causes a portion of an upper surface of the sealed container 310 to bow upward when the tension is released. Because the blade 322 may be pointed in a direction that is opposite of a direction of travel of the sealed container 310, and may be aligned horizontally in a common plane of the front seam 314, the robot on which the blade 322 is provided (not shown) need not cause the blade 322 to move either forward or backward in the direction of travel of the sealed container 310. Rather, so long as the blade 322 is properly aligned with regard to the front seam 314, the motion of the sealed container 310 may cause the blade 322 to contact the front seam 314 without any further motion imparted thereon by the robot.

Subsequently, as is shown in FIG. 3B, a blade 332 may be provided on a robot (not shown) and caused to contact the top seam 316 of the closing agent 312, e.g., by passing horizontally across the top seam 316, while the container 310 is in motion. The cutting of the closing agent 312 at the top seam 316 may be aided by the bowing of the upper surface of the container 310 following the cutting of the adhesive tape at the front seam 314, and may further relieve tension in the closing agent 312, thereby further causing the portion of the upper surface of the container 310 to bow upward when such tension is released. Because the blade 332 may be aligned in parallel with the top seam 316, the robot on which the blade 332 is provided (not shown) need only cause the blade 332 to move vertically upward or downward, and to come into contact with the closing agent 312 at the top seam 316, and need not cause the blade 332 to move either forward or backward in the direction of travel of the container 310.

Figure 3C:
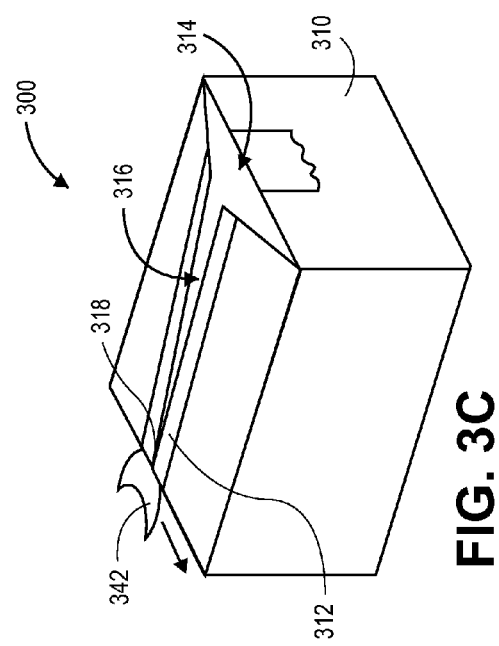

Finally, as is shown in FIG. 3C, a blade 342 may be provided on a robot (not shown) and caused to contact the rear seam 318 of the closing agent 312, e.g., by passing horizontally behind the rear seam 318, while the container 310 is in motion. The cutting of the closing agent 312 at the rear seam 318 releases all tension in the closing agent 312 and causes the container 310 to be entirely unsealed. Because the blade 342 is pointed in a direction of travel of the container 310, and may be aligned in a common plane of the rear seam 318, the robot on which the blade 342 is provided (not shown) must cause the blade 342 to move forward from behind the container 310, in the direction of travel of the container 310, and at a faster speed than the container 310, in order to ensure that the blade 342 may properly contact the closing agent 312 on the rear seam 318.

Accordingly, as is shown in FIGS. 3A-3D, the systems and methods of the present disclosure may be utilized to open the various seams of a sealed object, such as the sealed container 310 of FIG. 3A, by causing one or more robots to drive one or more blades into such seams as the sealed object passes by, through or beneath the robots. The systems and methods disclosed herein may thus provide a number of advantages over conveying systems and methods of the prior art, in that the systems and methods of the present disclosure may automatically cause one or more seams or edges of the sealed object to be opened before the sealed object ever reaches workers or other personnel responsible for opening and inspecting the contents thereof.

Furthermore, although the system 200 of FIG. 2B includes three delta robots 220, 230, 240 provided in series, the systems and methods disclosed herein are not so limited, and may be utilized in connection with any number of delta robots in accordance with the present disclosure. For example, a single delta robot may be provided for cutting just one seam of a closing agent such as an adhesive tape or other layer provided on a sealed object. Where a sealed object includes closing agents provided on multiple seams, cutting a single seam of closing agents provided on the sealed object, or fewer than all of the seams of the closing agents on the sealed object, may still provide an advantage to a worker by making the task of manually ripping or tearing the closing agents on other seams simpler and easier.

For example, as is shown in FIGS. 3B and 3C, cutting a single seam of a closing agent 312 on a sealed container 310 causes tension provided by the closing agent 312 to be relieved at least at that seam, thereby causing at least an upper portion of the sealed container 310 to bow upwardly in response to the relief of tension therein. Therefore, even if only a single seam of an adhesive tape or other closing agent on a sealed object is cut, a worker may obtain leverage over the sealed object by gripping the upwardly bowed portion and ripping open the remainder of the adhesive tape or agent, thereby fully opening the sealed object using his or her bare hands or a handheld tool.

As is also discussed above, the systems and methods of the present disclosure may guide the operation of one or more of the robots based on imaging data captured using a sealed container or other object having a closing agent such as an adhesive tape or other layer that requires cutting. The imaging data may be analyzed to recognize features of the sealed container or object, including but not limited to seams or folds having closing agents thereon, and to generate instructions for causing one or more of the robots to be repositioned in a manner that places blades provided on end effectors thereof into contact with one or more of the seams or folds of the container or other object.

For example, the imaging data may be used to determine an elevation of a seam or a fold that is covered by an adhesive tape or other layer on the container or other object, and to raise or lower the blades, as necessary, to come into contact with the seam or the fold. Alternatively, the imaging data may be used to generate one or more vectors representative of the travel of the container or other object, or of aspects of the container or other object (e.g., a velocity of the container or the seams or folds thereon, as well as a location where the container or the seams or folds may be anticipated upon their arrival at a given robot), and utilize such vectors in determining when (e.g., specific times) the container or the other object, or the aspects of the container or the other object, will arrive at one or more of the robots. Instructions for placing blades provided on end effectors at such elevations or in such locations and at such times may be generated accordingly. Thus, once the item is placed onto a conveyor aligned with the robots, and imaging data is captured therefrom using one or more imaging devices, the robots may be guided into position to cut an adhesive tape or other layer provided thereon at one or more seams or folds, or in any other designated locations.

Figure 4:
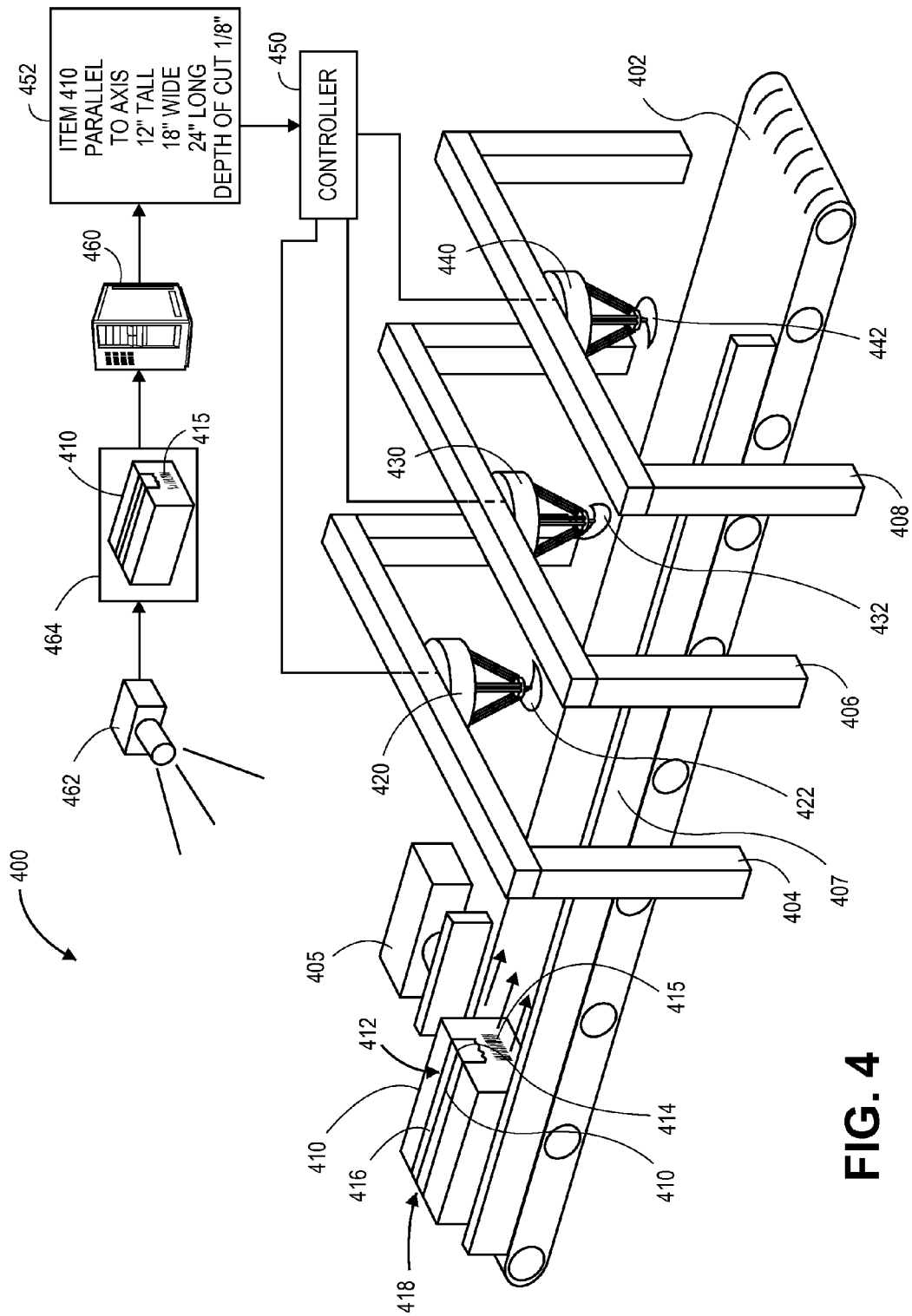
FIG. 4 is a view of components of one system for opening packages at high speeds using robots in accordance with embodiments of the present disclosure.

Referring to FIG. 4, a view of components of one system 400 for opening packages at high speeds using robots in accordance with embodiments of the present disclosure is shown. The system 400 includes a conveyor 402, a pusher 405, three robots 420, 430, 440 suspended over the conveyor 402, a controller 450, a server 460 and an imaging device 462. The system further includes three frames 404, 406, 408 which provide support for the robots 420, 430, 440 suspended above the conveyor 402. An item 410 (e.g., a box or other container) is provided on the conveyor 402, which further includes a runner 407 extending along the conveyor 402. The item 410 includes an adhesive tape 412 extending across a front seam 414, a top seam 416 and a rear seam 418 of the item 410. The item 410 further includes a bar code 415 or other marked identifier on a front face.

As is shown in FIG. 4, the pusher 405 is provided for pressing a face of the item 410 against the runner 407, as the item 410 travels down the conveyor 402. The runner 407 thereby ensures that the alignment of the item 410 will remain constant as the item 410 passes along the conveyor 402. The imaging device 462 is provided to capture imaging data 464, e.g., one or more digital images, associated with the item 410.

In accordance with the present disclosure, the imaging data 464 is provided to the server 460, which analyzes the imaging data 464 and derives information 452 regarding the dimensions and configuration of the item 410 on the conveyor 402. For example, as is shown in FIG. 4, the server 460 may identify the item 410 based on the imaging data 464, e.g., by reading and interpreting the bar code 415 thereon, and the information 452 may identify the item 410 on this basis. Alternatively, an item may be identified by reading any other markings thereon, e.g., alphanumeric characters, symbols or other markings, or by any other means, such as radio frequency identification (RFID). Additionally, the information 452 may further include a configuration or orientation of the adhesive tape 412 on the item 410 (viz., parallel to axis) and dimensions of the item 410 (viz., a height, a width and a length), as determined based on the imaging data 464. For example, based on the configuration or the orientation of the adhesive tape 412 or the item, the operation of the individual robots 420, 430, 440 may be customized accordingly to cut the item 410 or the adhesive tape 412 in different locations. Using an identification of a configuration or an orientation of the adhesive tape 412, as well as any dimensions of the item 410, the server 460 may determine a depth at which the item 410 or the adhesive tape 412 should be cut, and the information 452 provided to the controller 450 may designate the depth of the cut accordingly.

Accordingly, based on the configuration or alignment of the adhesive tape 412 on the item 410, and the orientation or the dimensions of the item 410, as determined based on the imaging data 462, as well as a known operating speed of the conveyor 402, the controller 450 may calculate times at which the item 410 is anticipated to arrive at each of the robots 420, 430, 440, and provide operating instructions to the robots 420, 430, 440 accordingly. In some embodiments, the orientation of the item 410 may be automatically defined by the system 410, e.g., by the pusher 405, or by one or more like devices or components (not shown) for establishing an orientation of the item 410, such as by rotating the item 410. Alternatively, the system 400 may determine the orientation of the item 410 or the alignment of the adhesive tape 412 and adjust the operation of the respective robots 420, 430, 440 accordingly. The instructions provided to the robots 420, 430, 440 may cause the robots 420, 430, 440 to pre-position the blades 422, 432, 442, as necessary, such that the blades 422, 432, 442 may contact the adhesive tape 412 on the front seam 414, the top seam 416 and the rear seam 418, as applicable, at each of the predetermined times.

Figure 5:
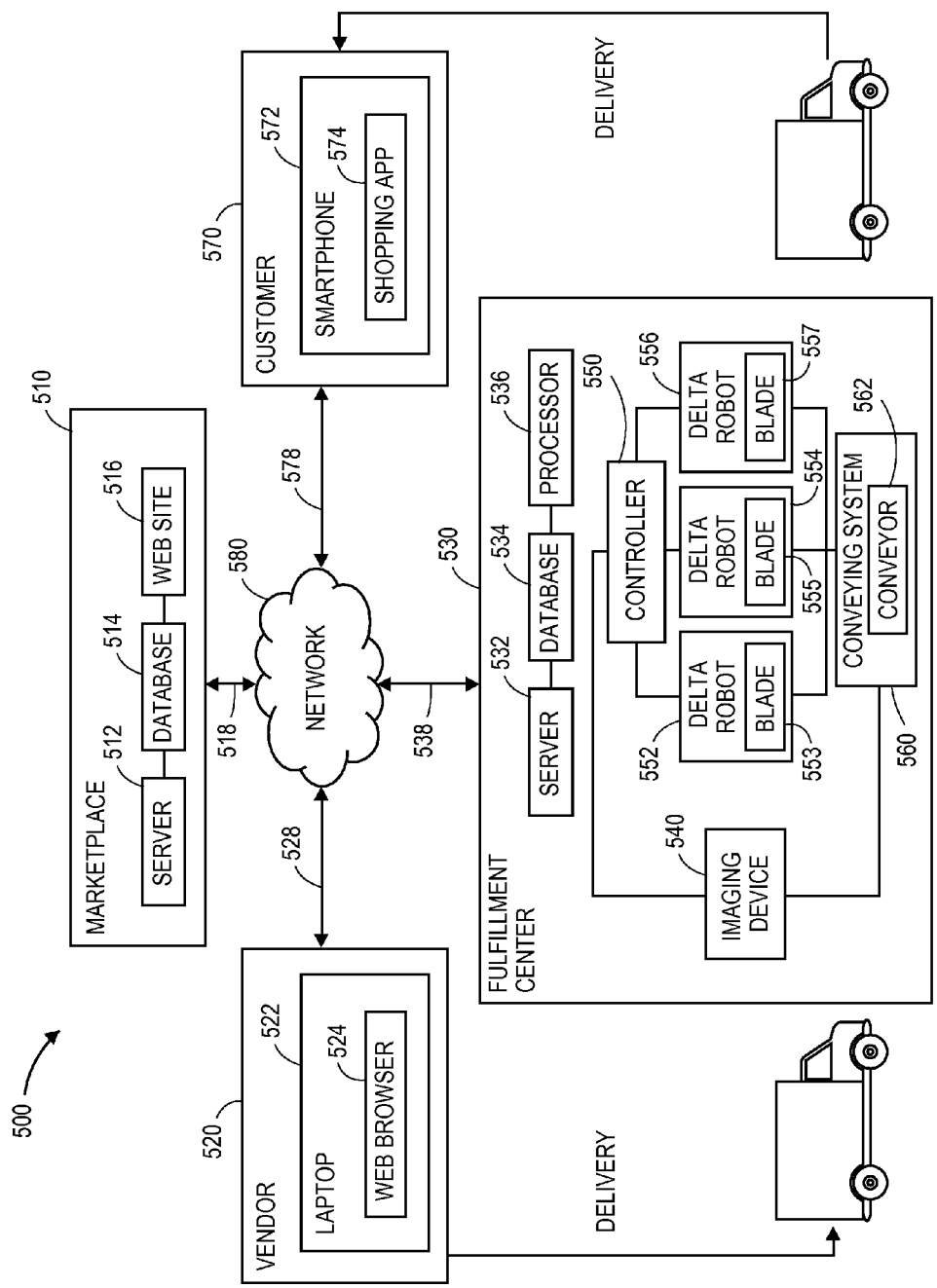
FIG. 5 is a block diagram of components of one system for opening packages at high speeds using robots in accordance with embodiments of the present disclosure.

The robots and other elements of the present disclosure described herein may be provided in any environment or facility in which a conveying system is utilized, including but not limited to a fulfillment center, a storage or distribution facility, a warehouse or another like structure. Referring to FIG. 5, a block diagram of components of one system 500 for opening packages at high speeds using robots in accordance with embodiments of the present disclosure. The system 500 includes a marketplace 510, a vendor 520, a fulfillment center 530 and a customer 570 that are connected to one another across a network 580, such as the Internet.

The marketplace 510 may be any entity or individual that wishes to make items from a variety of sources available for download, purchase, rent, lease or borrowing by customers using a networked computer infrastructure, including one or more physical computer servers 512 and databases (or other data stores) 514 for hosting a web site 516. The marketplace 510 may be physically or virtually associated with one or more storage or distribution facilities, such as the fulfillment center 530. The web site 516 may be implemented using the one or more servers 512, which connect or otherwise communicate with the one or more databases 514 as well as the network 580, as indicated by line 518, through the sending and receiving of digital data. Moreover, the database 514 may include any type of information regarding items that have been made available for sale through the marketplace 510, or ordered by customers from the marketplace 510.

The vendor 520 may be any entity or individual that wishes to make one or more items available to customers, such as the customer 570, by way of the marketplace 510. The vendor 520 may operate one or more order processing and/or communication systems using a computing device such as a laptop computer 522 and/or software applications such as a web browser 524, which may be implemented through one or more computing machines that may be connected to the network 580, as is indicated by line 528, in order to transmit or receive information regarding one or more items to be made available at the marketplace 510, in the form of digital or analog data, or for any other purpose.

The vendor 520 may deliver one or more items to one or more designated facilities maintained by or on behalf of the marketplace 510, such as the fulfillment center 530. Additionally, the vendor 520 may receive one or more items from other vendors, manufacturers or sellers (not shown), and may deliver one or more of such items to locations designated by the marketplace 510, such as the fulfillment center 530, for fulfillment and distribution to customers. Furthermore, the vendor 520 may perform multiple functions. For example, the vendor 520 may also be a manufacturer and/or a seller of one or more other items, and may offer items for purchase by customers at venues (not shown) other than the marketplace 510. Additionally, items that are made available at the marketplace 510 or ordered therefrom by customers may be made by or obtained from one or more third party sources, other than the vendor 520, or from any other source (not shown). Moreover, the marketplace 510 itself may be a vendor, a seller or a manufacturer.

The fulfillment center 530 may be any facility that is adapted to receive, store, process and/or distribute items. As is shown in FIG. 5, the fulfillment center 530 includes a networked computer infrastructure for performing various computer-related functions associated with the receipt, storage, processing and distribution of such items, including one or more physical computer servers 532, databases (or other data stores) 534 and processors 536. The fulfillment center 530 may also include stations for receiving, storing and distributing items to customers, such as one or more receiving stations, storage areas and distribution stations. The fulfillment center 530 further includes an imaging device 540, a robot controller 550, a plurality of delta robots 552, 554, 556, each featuring a blade 553, 555, 557, as well as a conveying system 560 having at least one conveyor 562.

The imaging device 540 may be any form of optical recording device that may be used to photograph or otherwise record images of structures, facilities or other elements within the fulfillment center 530, as well as the items within the fulfillment center 530, or for any other purpose. Such imaging devices 540 may capture one or more still or moving images, as well as any relevant audio signals or other information, within one or more designated locations within the fulfillment center 530, and may be connected to the server 532 or with one another by way of an internal network (not shown). Additionally, the imaging devices 540 may be adapted or otherwise configured to communicate with one another, or with the marketplace 510 or the marketplace server 512, the vendor 520 or the vendor laptop 522 or the customer 570 or customer smartphone 572, or to access one or more other computer devices by way of the network 580. Although the fulfillment center 530 of FIG. 5 includes a single box corresponding to one imaging device 540, any number or type of imaging devices may be provided in accordance with the present disclosure, including but not limited to digital cameras or other optical sensors.

The controller 550 may be any type or form of electronic device configured to control the operation of one or more of the delta robots 552, 554, 556. The controller 550 may generate instructions or commands for operating the delta robots 552, 554, 556 based on information received from the imaging device 540 or the conveying system 560, as well as the server 532, the processor 536, or any other external computing device via the network 580. For example, the controller 550 may transmit one or more control signals to motors associated with one or more carriages, motors, arm linkages or individual arms, as well as an end effector or mechanized component provided thereon. Thus, in response to such control signals, an end effector having a blade 553, 555, 557 mounted thereon may be raised or lowered to a vertical elevation, or translated forward, rearward, to the left or to the right in a horizontal direction to a lateral position, as necessary. The controller 550 may be associated with any form of motors, power sources or other components.

The conveying system 560 may comprise one or more powered or powerless conveyors 562 that are provided for transporting objects, items or materials of varying sizes and shapes, and include any number of machines or elements for causing the motion or translation of such objects, items or materials from one location to another. Any form of mover, including but not limited to belts, chains, screws, tracks or rollers, may drive such machines or elements and the objects, items or materials may be transported within such conveying systems in a container or carrier, or on or within the mover itself. Such machines or elements may further include one or more pulleys, shafts, hubs, bushings, sprockets, bearings and other elements for causing a movement of a conveyor. Further, the conveying system 560 may convey objects, items or materials into one or more static or dynamic conveying apparatuses, which may include one or more machines or elements such as a bin, a chute, a cart, a truck or another like apparatus.

The fulfillment center 530 also includes one or more workers (not shown), who may be any designated personnel tasked with performing one or more tasks within the fulfillment center 530. Such workers may handle or transport items (e.g., any type or form of good, product, media or other tangible consumer article) within the fulfillment center 530, or operate one or more pieces of equipment therein (not shown). The workers may also operate one or more specific computing devices or machines for registering the receipt, retrieval, transportation or storage of items within the fulfillment center 530, or a general purpose device such a personal digital assistant, a digital media player, a smartphone, a tablet computer, a desktop computer or a laptop computer (not shown), which may include any form of input and/or output peripherals such as scanners, readers, keyboards, keypads, touchscreens or like devices.

The fulfillment center 530 may operate one or more order processing and/or communication systems using computer devices in communication with one or more of the server 532, the database 534 and/or the processor 536, or through one or more other computing devices or machines that may be connected to the network 580, as is indicated by line 538, in order to transmit or receive information in the form of digital or analog data, or for any other purpose. Such computer devices may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices may be general purpose devices or machines, or dedicated devices or machines that feature any form of input and/or output peripherals such as scanners, readers, keyboards, keypads, touchscreens or like devices, and may further operate or provide access to one or more engines for analyzing the information or data regarding the workflow operations, or the interactions received from the one or more operators, users or workers.

Additionally, as is discussed above, the fulfillment center 530 may include one or more receiving stations featuring any apparatuses that may be required in order to receive shipments of items at the fulfillment center 530 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The fulfillment center 530 may also include one or more predefined two-dimensional or three-dimensional storage areas including facilities, for accommodating items and/or containers of such items, such as aisles, rows, bays, shelves, slots, bins, racks, tiers, bars, hooks, cubbies or other like storage means, or any other appropriate regions or stations. The fulfillment center 530 may further include one or more distribution stations where items that have been retrieved from a designated storage area may be evaluated, prepared and packed for delivery from the fulfillment center 530 to addresses, locations or destinations specified by customers, also by way of carriers such as cars, trucks, trailers, freight cars, container ships or cargo aircraft (e.g., manned aircraft or unmanned aircraft, such as drones).

The customer 570 may be any entity or individual that wishes to download, purchase, rent, lease, borrow or otherwise obtain items (e.g., goods, products, services or information of any type or form) from the marketplace 510. The customer 570 may utilize one or more computing devices, such as a smartphone 572 or any other like machine that may operate or access one or more software applications, such as a web browser (not shown) or a shopping application 574, and may be connected to or otherwise communicate with the marketplace 510, the vendor 520 or the fulfillment center 530 through the network 580, as indicated by line 578, by the transmission and receipt of digital data. Moreover, the customer 570 may also receive deliveries or shipments of one or more items from facilities maintained by or on behalf of the marketplace 510, such as the fulfillment center 530, or from the vendor 520.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "vendor," a "fulfillment center," a "worker," or a "customer," or like terms, may be automated steps performed by their respective computer systems, or implemented within software modules (or computer programs) executed by one or more general purpose computers. Moreover, process steps described as being performed by a "marketplace," a "vendor," a "fulfillment center," a "worker," or a "customer" may be typically performed by a human operator, but could, alternatively, be performed by an automated agent.

The marketplace 510, the vendor 520, the fulfillment center 530 and/or the customer 570 may use any web-enabled or Internet applications or features, or any other client-server applications or features including electronic mail (or E-mail), or other messaging techniques, to connect to the network 580 or to communicate with one another, such as through short or multimedia messaging service (SMS or MMS) text messages. For example, the server 532 may be adapted to transmit information or data in the form of synchronous or asynchronous messages from the fulfillment center 530 to the server 512, the laptop computer 522, a desktop computer, the smartphone 572 or any other computer device in real time or in near-real time, or in one or more offline processes, via the network 580. Those of ordinary skill in the pertinent art would recognize that the marketplace 510, the vendor 520, the fulfillment center 530 or the customer 570 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the server 512, the laptop computer 522, the server 532, or the smartphone 572, or any other computers or control systems utilized by the marketplace 510, the vendor 520, the fulfillment center 530 or the customer 570 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 6:
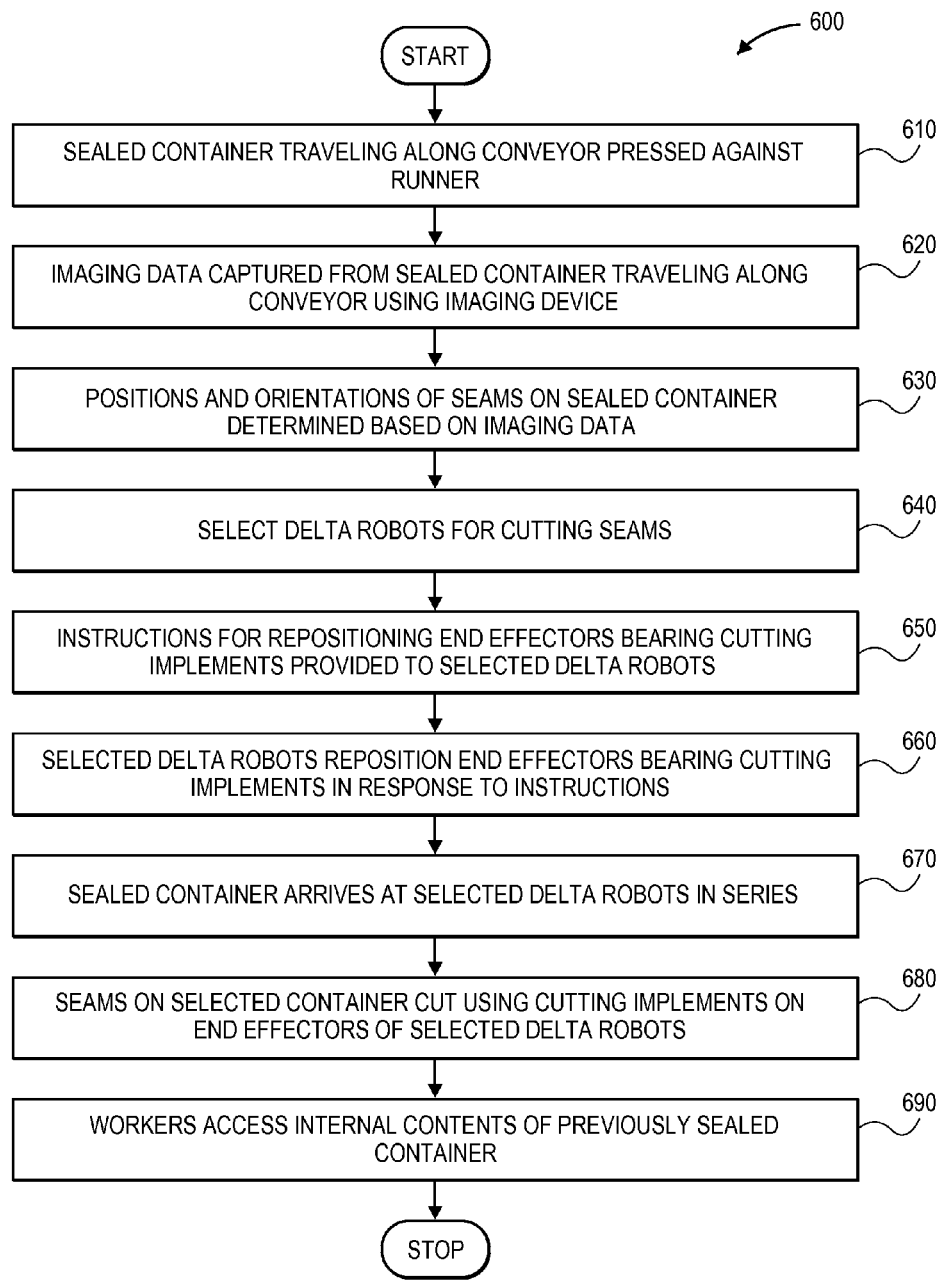
FIG. 6 is a flow chart of one process for opening packages at high speeds using robots in accordance with embodiments of the present disclosure.

As is discussed above, the systems and methods of the present disclosure are directed to providing a plurality of robots in series along one or more conveying systems, wherein each of the robots comprises a blade or other cutting implement. The systems and methods disclosed herein may be configured to determine the locations of seams or folds of a closing agent or covering on an object, e.g., based on imaging data captured using one or more imaging devices, and to reposition the robots to cause one or more of the respective blades to come into contact to the seams or folds as the object travels along on a conveyor. Referring to FIG. 6, a flow chart 600 of one process for opening packages at high speeds using robots in accordance with embodiments of the present disclosure is shown.

At box 610, a sealed container traveling along a conveyor is pressed against a runner. The pressing of the container ensures that the orientation of the container will remain fixed as the container travels along the conveyor. At box 620, imaging data is captured from the sealed container traveling along the conveyor using an imaging device. The imaging data may include one or more still or moving digital images, and may be captured using imaging devices configured above, around or in a vicinity of the conveyor. At box 630, the positions and orientations of seams on the sealed container are determined based on the imaging data. Such seams may be recognized based on any observed edges, contours or outlines of features of the container, or of one or more adhesive layers provided thereon. The positions and orientations of the seams may be expressed in the form of vectors based on their spatial positions and their velocities, which may be driven primarily by the speed of the conveyor.

At box 640, one or more delta robots are selected for cutting the seams on the sealed container. Where a plurality of delta robots is provided in association with the conveyor, one or more of the delta robots may be selected on any basis, including but not limited to one or more dimensions of the sealed container, or one or more dimensions of an adhesive layer or seam provided on the sealed container, as well as a speed of the conveyor and the orientation of the sealed container thereon. For example, the delta robots to be used to cut the seams may be selected based on whether the adhesive tape is aligned in a direction of travel of the conveyor, such as the adhesive tape 412 on the sealed container 410 shown in FIG. 4, or perpendicular to the direction of travel of the conveyor.

At box 650, instructions for repositioning end effectors bearing cutting implements are provided to the selected delta robots. Such instructions may cause the end effectors and, therefore, the cutting implements to be raised or lowered, or moved to the left, right, forward or backward. Alternatively, where one of a plurality of delta robots is not selected for cutting the seams, one or more instructions for lifting or otherwise moving the end effector and/or the cutting implement out of range of the sealed container as the sealed container passes along the conveyor. At box 660, the selected delta robots cause the end effectors bearing cutting implements to be repositioned in response to the instructions. For example, the delta robots selected at box 640 may raise, lower or otherwise reposition one or more arm linkages, carriages or other aspects of the delta robot itself, or operate one or more motors, to cause the end effectors and the associated blades or other cutting implements to be placed into positions defined by the instructions.

At box 670, the sealed container arrives at the selected delta robots in series, and at box 680, the seams on the sealed container are cut using one or more cutting implements on the end effectors of the selected delta robots. For example, referring again to FIG. 2B, the sealed container 210 may arrive at the delta robots 220, 230, 240, one after another, and the blades 222, 232, 242 may be used to cut the front seam 214, the top seam 216 and the rear seam 218 of the closing agent 212 on the sealed container 210. At box 690, after the seams identified at box 630 have been cut, workers may access the internal contents of the previously sealed container, and the process ends. For example, an adhesive tape may be sheared at each of the seams on which the adhesive tape is provided, or on some of the seams, thereby permitting the workers to manually rip or tear the adhesive tape at locations of other seams.

Therefore, in accordance with the present disclosure, one or more robots may facilitate the opening of sealed packages or containers traveling along a conveyor or conveying system by being configured to cut seams using blades or other cutting implements.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, although some of the embodiments of the present disclosure are shown as being utilized in a fulfillment center environment, e.g., wherein sealed boxes or other containers arrive at a fulfillment center, the systems and methods disclosed herein are not so limited.

For example, the systems and methods of the present disclosure may be provided in series along one or more conveying systems or any other apparatuses, including such systems which do not require the use of robots. For example, where a container is sealed using adhesive tapes applied to both upper and lower portions of the container, the adhesive tape on the upper portion may be cut using blades associated with one or more robots provided in series, while the adhesive tape on the lower portion may be cut using blades provided on or adjacent to a conveying surface.

Moreover, the systems and methods of the present disclosure are not limited to the cutting of adhesive tapes or other layers. Rather, such systems and methods may be used to remove staples using magnets or mechanical extractors provided on end effectors of one or more robots, or take any action to relieve tension in one or more aspects of a sealed container or object, or otherwise create an opening by which a worker may more easily access internal contents of the sealed container or object. Furthermore, the systems and methods disclosed herein are not limited to boxes. Rather, one or more robots may be provided for the purpose of recognizing an orientation or a geometry of an envelope, a vacuum-sealed container, or any other object formed from not only paper but also plastic, wood, rubber or any other materials that may be cut or slit using a cutting implement provided on such robots.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow chart shown in FIG. 6, the order in which the boxes or steps of the methods or processes are listed is not intended to be construed as a limitation on the claimed inventions, and any number of the boxes or steps can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or boxes or steps. In a similar manner, terms such as "include," "including" and "includes are generally intended to mean "including, but not limited to." Thus, such conditional language is not generally intended to imply that features, elements and/or boxes or steps are in any way required for one or more embodiments or that one or more embodiments necessarily include logic for deciding, with or without user input or prompting, whether these features, elements and/or boxes or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A conveying system comprising:
   an imaging device;
   a conveyor defining a direction of travel along an axis, and conveying an object in the direction of travel;
   a first delta robot mounted above the conveyor having a first blade provided on a first end effector, wherein the first blade is pointed opposite to the direction of travel along the axis;
   a second delta robot mounted above the conveyor having a second blade provided on a second end effector, wherein the second blade is pointed toward the conveyor and perpendicular to the axis;
   a third delta robot mounted above the conveyor having a third blade provided on a third end effector, wherein the third blade is pointed in the direction of travel along the axis; and
   a computing device in communication with the imaging device, the conveyor, the first delta robot, the second delta robot and the third delta robot,
   wherein the computing device is configured to at least:
      capture imaging data regarding the object using the imaging device;
      identify at least one adhesive label provided on the object based at least in part on the imaging data;
      determine a velocity vector of the at least one adhesive label provided on the object;
      generate instructions for causing at least one of the first delta robot, the second delta robot or the third delta robot to position at least one of the first blade, the second blade or the third blade into contact with the at least one adhesive label provided on the object based at least in part on the velocity vector; and
      provide the instructions to the at least one of the first delta robot, the second delta robot or the third delta robot.

2. The conveying system of claim 1, wherein the computing device is further configured to at least:
   identify a first portion of the at least one adhesive label based at least in part on the imaging data;
   identify a second portion of the at least one adhesive label based at least in part on the imaging data;
   identify a third portion of the at least one adhesive label based at least in part on the imaging data;
   provide at least one instruction to the first delta robot for causing the first delta robot to position the first blade into contact with the first portion of the adhesive label;
   provide at least one instruction to the second delta robot for causing the second delta robot to position the second blade into contact with the second portion of the adhesive label; and
   provide at least one instruction to the third delta robot for causing the third delta robot to position the third blade into contact with the third portion of the adhesive label.

3. A method comprising:
causing at least one conveyor to place an object into motion at a first speed;
capturing imaging data regarding the object using at least one imaging device;
identifying a closing agent provided on at least one surface of the object by at least one computer processor;
determining an elevation of a first portion of the closing agent based at least in part on the imaging data by the at least one computer processor;
determining an orientation of the closing agent on the at least one surface of the object by the at least one computer processor, wherein the orientation of the closing agent is determined based at least in part on the imaging data;
generating at least one instruction for causing at least one robot to place at least one cutting implement into contact with at least the first portion of the closing agent based at least in part on the elevation;
providing the at least one instruction to the at least one robot; and
causing the at least one robot to place the at least one cutting implement into contact with at least the first portion of the closing agent.

4. The method of claim 3, wherein at least a second portion of the closing agent is further provided on at least one edge of the object, and
wherein the method further comprises:
causing the at least one robot to place the at least one cutting implement into contact with at least the second portion of the closing agent.

5. The method of claim 3, wherein the at least one robot comprises a plurality of arm linkages,
wherein each of the arm linkages comprises a proximal end pivotally mounted to a base and a distal end mounted to an end effector, and
wherein the at least one cutting implement is mounted to the end effector.

6. The method of claim 3, wherein determining the orientation of the closing agent on the at least one surface of the object comprises:
causing an apparatus to place the object into a first alignment,
wherein the orientation of the closing agent on the at least one surface of the object is determined with the object in the first alignment.

7. The method of claim 3, further comprising:
determining an anticipated lateral position of the first portion of the closing agent based at least in part on the imaging data,
wherein the at least one instruction is generated based at least in part on the anticipated lateral position.

8. The method of claim 3, wherein the object is a box, and
wherein the first portion of the closing agent is a strip of tape covering a seam formed by at least two flaps of the box.

9. A method comprising:
identifying a closing agent provided on at least one surface of an object by at least one computer processor;
determining an orientation of the closing agent on the at least one surface of the object by the at least one computer processor;
causing at least one conveyor to place the object into motion at a first speed;
determining a vector representative of the motion of the object based at least in part on the first speed;
determining a first time at which a first portion of the closing agent will reach a first robot provided above the at least one conveyor based at least in part on the vector and the orientation;
identifying a first position of the first portion of the closing agent at the first time based at least in part on the vector and the orientation;
causing the first robot to place a first cutting implement into contact with at least the first portion of the closing agent in the first position at the first time;
determining a second time at which a second portion of the closing agent will reach a second robot provided above the at least one conveyor based at least in part on the vector and the orientation;
identifying a second position of the second portion of the closing agent at the second time based at least in part on the vector and the orientation; and
causing the second robot to place a second cutting implement into contact with at least the second portion of the closing agent in the second position at the second time.

10. The method of claim 9, further comprising:
causing the first robot to move at least the first cutting implement into the first position prior to the first time; and
causing the second robot to move at least the second cutting implement into the second position prior to the second time.

11. The method of claim 10, wherein the first cutting implement is aligned parallel to a plane of the at least one conveyor and pointed in a direction opposite to a direction of travel of the object, and
wherein the second cutting implement is aligned perpendicular to the plane of the at least one conveyor and pointed vertically downward toward the at least one conveyor.

12. The method of claim 10, further comprising:
determining a third time at which a third portion of the closing agent will reach a third robot provided above the at least one conveyor based at least in part on the vector and the orientation;
identifying a third position of the third portion of the closing agent at the third time based at least in part on the vector and the orientation; and
causing the third robot to place a third cutting implement into contact with at least the third portion of the closing agent in the third position at the third time.

13. The method of claim 9, wherein the object is a box, and
wherein the first portion of the closing agent is a strip of tape covering a seam formed by at least two flaps of the box.

14. A method comprising:
identifying information regarding a sealed box in motion, wherein the sealed box includes at least one adhesive layer thereon, and wherein the at least one adhesive layer includes a first portion crossing at least one edge of the sealed box and a second portion joining at least two flaps of the sealed box;
determining, by at least one computer processor, a vector corresponding to the motion of the sealed box based at least in part on the information regarding the sealed box;
calculating, by the at least one computer processor, a first time at which the first portion of the at least one adhesive layer will arrive at a first delta robot based at least in part on the vector;

determining, by the at least one computer processor, at least one of an elevation of the first portion or a lateral position of the first portion of the at least one adhesive layer at the first time;

positioning, using the first delta robot, a first cutting implement at the elevation of the first portion or the lateral position of the first portion prior to the first time;

calculating, by the at least one computer processor, a second time at which the second portion of the at least one adhesive layer will arrive at a second delta robot based at least in part on the vector;

determining, by the at least one computer processor, at least one of an elevation of the second portion of the at least one adhesive layer or a lateral position of the second portion of the at least one adhesive layer at the second time; and positioning, using the second delta robot, a second cutting implement at the elevation of the second portion of the at least one adhesive layer or the lateral position of the second portion of the at least one adhesive layer prior to the second time.

15. The method of claim 14, further comprising:

identifying imaging data captured using at least one imaging device, wherein the imaging data is associated with the sealed box; and wherein the information regarding the sealed box comprises the imaging data.

16. The method of claim 15, further comprising:

determining an orientation of the at least one adhesive layer based at least in part on the imaging data, wherein the first time and the second time are calculated based at least in part on the orientation.

17. The method of claim 14, further comprising:

providing, by a robot controller in communication with the at least one computer processor, an instruction to the first delta robot for positioning the first cutting implement at the elevation of the first portion or the lateral position of the first portion prior to the first time; and providing, by the robot controller in communication with the at least one computer processor, an instruction to the second delta robot for positioning the second cutting implement at the elevation of the second portion or the lateral position of the second portion prior to the second time.

* * * * *